United States Patent
Ljulj et al.

(10) Patent No.: US 10,443,724 B2
(45) Date of Patent: Oct. 15, 2019

(54) MANUAL PARK RELEASE FOR ELECTRONICALLY SHIFTABLE TRANSMISSIONS

(71) Applicants: Toma Ljulj, Belle River (CA); Christopher R Reynolds, Oxford, MI (US)

(72) Inventors: Toma Ljulj, Belle River (CA); Christopher R Reynolds, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 190 days.

(21) Appl. No.: 15/587,521

(22) Filed: May 5, 2017

(65) Prior Publication Data

US 2018/0320787 A1 Nov. 8, 2018

(51) Int. Cl.
*F16H 63/34* (2006.01)

(52) U.S. Cl.
CPC ...... *F16H 63/3491* (2013.01); *B60Y 2200/92* (2013.01)

(58) Field of Classification Search
CPC ........... F16H 63/3491; F16H 2061/226; F16H 2061/223
USPC ............ 74/473.15, 473.23; 192/220.6, 220.7
See application file for complete search history.

(56) References Cited

U.S. PATENT DOCUMENTS

| | | | |
|---|---|---|---|
| 3,649,782 A * | 3/1972 | Feldman | B60Q 9/001 200/43.05 |
| 3,702,550 A * | 11/1972 | Shimizu | B60R 25/02142 70/252 |
| 4,932,283 A * | 6/1990 | Ishigami | B60R 25/02144 477/99 |
| 6,293,363 B1 | 9/2001 | Rangaswamy et al. | |
| 6,805,212 B2 | 10/2004 | Thomas | |
| 8,104,599 B2 * | 1/2012 | Jung | F16C 1/12 192/220.2 |
| 8,408,088 B2 * | 4/2013 | Park | F16H 63/3466 74/473.12 |
| 9,239,107 B2 * | 1/2016 | Galden | F16H 61/22 |
| 9,488,273 B2 * | 11/2016 | Hopkins | F16H 63/3491 |
| 2014/0318297 A1 * | 10/2014 | Scheiblecker | F16H 63/3491 74/473.23 |
| 2015/0298663 A1 * | 10/2015 | Tashiro | F16H 63/3416 188/2 D |

FOREIGN PATENT DOCUMENTS

FR 2995057 A1 * 3/2014 ......... F16H 63/3433

* cited by examiner

*Primary Examiner* — Victor L MacArthur
*Assistant Examiner* — Gregory Robert Weber
(74) *Attorney, Agent, or Firm* — Ralph E. Smith (57) ABSTRACT

A rotary actuator assembly for a manual park release system of a vehicle transmission is provided. The assembly includes a cable link configured to couple to a manual park release cable, the manual park release cable configured to couple to the transmission to selectively move the transmission between a park gear and an out-of-park gear, and a key configured to engage and rotate the cable link. The key rotates the cable link between a first position, a second position, and a third position. In the first position, the cable link is in an inactive position. In the second position, the cable link is configured to move the manual park release cable to shift the transmission to the out-of-park gear. In the third position, the cable link is configured to move the manual park release cable to shift the transmission to the park gear.

18 Claims, 8 Drawing Sheets

FIG. 7D

MANUAL PARK RELEASE FOR ELECTRONICALLY SHIFTABLE TRANSMISSIONS

FIELD

The present application relates generally to electronically shiftable transmissions and, more particularly, to a manual park release for an electronically shiftable transmission.

BACKGROUND

Some conventional vehicles, such as hybrid electric vehicles, include electronically shiftable transmissions. If the vehicle power system loses charge, the driver cannot shift the transmission into and out of park from a seated position. Instead, the driver must exit the vehicle and manually engage and disengage a park pawl mounted to the transmission in order to shift the transmission, for example, when the vehicle needs to be towed. Thus, while such manual park release systems work well for their intended purpose, there remains a desire for improvement in the relevant art.

SUMMARY

According to one example aspect of the invention, a rotary actuator assembly for a manual park release system of a vehicle transmission is provided. The assembly includes, in one exemplary implementation, a cable link configured to couple to a manual park release cable, the manual park release cable configured to couple to the transmission to selectively move the transmission between a park gear and an out-of-park gear, and a key configured to engage and rotate the cable link. The key rotates the cable link between a first position, a second position, and a third position. In the first position, the cable link is in an inactive position. In the second position, the cable link is configured to move the manual park release cable to shift the transmission to the out-of-park gear. In the third position, the cable link is configured to move the manual park release cable to shift the transmission to the park gear.

In addition to the foregoing, the described assembly may include one or more of the following features: an outer ring having a receiving aperture that includes a receiving notch, the key having an insertion end having a keyed projection extending therefrom, wherein the insertion end can only be inserted into the receiving aperture when the keyed projection is aligned with the receiving notch; wherein in the first position the key can be inserted into and removed from the outer ring, and wherein in the second and third positions the key cannot be removed from the outer ring; a fixed hub fixed from rotation, the fixed hub having an aperture to receive at least a portion of the key, and an inner locking ring disposed between the fixed hub and the outer ring; wherein the inner locking ring includes a gap configured to selectively align with the receiving notch, wherein when the gap is aligned with the receiving notch to receive the keyed projection the key can be inserted into and removed from the fixed hub; and wherein the gap is disposed between a first stop projection and a second stop projection each extending outwardly from the inner locking ring, the first and second stop projections configured to be selectively engaged by the keyed projection to rotate the inner locking ring within the fixed hub to selectively block the receiving notch.

In addition to the foregoing, the described assembly may include one or more of the following features: an inner shaft disposed at least partially within the aperture of the fixed hub, the inner shaft having an upper surface with a recess configured to receive the insertion end of the key, and an outer surface having a projection extending therefrom; wherein the cable link includes a notch configured to receive the projection of the inner shaft, whereby rotation of the key imparts rotation to the inner shaft, which then imparts rotation to the cable link; a fixed base configured to couple to a portion of a vehicle, the fixed base defining an inner cavity configured to at least partially receive the inner shaft; and wherein the fixed base comprises a vertical stop configured to facilitate preventing vertical movement of the inner shaft, a first rotational stop configured to selectively engage the projection of the inner shaft when the cable link is in the second position, and a second rotational stop configured to selectively engage the projection of the inner shaft when the cable link is in the third position.

According to another example aspect of the invention, a manual park release system for an electronically shiftable transmission is provided. The system includes, in one exemplary implementation, a park release linkage assembly configured to couple to the transmission and shift the transmission between a park gear and an out-of-park gear, a manual park release cable having a first end and a second end, the first end coupled to the park release linkage assembly, and a rotary actuator assembly. The rotary actuator assembly includes a cable link coupled to the second end of manual park release cable, a key configured to engage and rotate the cable link. The key rotates the cable link between a first position, a second position, and a third position. In the first position, the cable link is in an inactive position. In the second position, the cable link is configured to move the manual park release cable to shift the transmission to the out-of-park gear. In the third position, the cable link is configured to move the manual park release cable to shift the transmission to the park gear.

In addition to the foregoing, the described manual park release system may include one or more of the following features: wherein the park release linkage assembly comprises a lever, a cable link member coupled between the lever and the first end of the manual park release cable, a power actuator link member, and a detent pivot pin coupled to the lever and operably coupled to the electronically shiftable transmission. Pushing or pulling of the manual park release cable causes the lever to rotate, and rotation of the lever causes the detent pivot pin to rotate. Rotation of the detent pivot pin shifts the electronically shiftable transmission between the park gear and the out-of-park gear; an outer ring having a receiving aperture that includes a receiving notch, the key having an insertion end having a keyed projection extending therefrom, wherein the insertion end can only be inserted into the receiving aperture when the keyed projection is aligned with the receiving notch; and wherein in the first position the key can be inserted into and removed from the outer ring, and wherein in the second and third positions the key cannot be removed from the outer ring.

In addition to the foregoing, the described manual park release system may include one or more of the following features: a fixed hub fixed from rotation, the fixed hub having an aperture to receive at least a portion of the key, and an inner locking ring disposed between the fixed hub and the outer ring; wherein the inner locking ring includes a gap configured to selectively align with the receiving notch, wherein when the gap is aligned with the receiving notch to receive the keyed projection the key can be inserted into and removed from the fixed hub; wherein the gap is disposed between a first stop projection and a second stop projection each extending outwardly from the inner locking ring, the first and second stop projections configured to be selectively engaged by the keyed projection to rotate the inner locking ring within the fixed hub to selectively block the receiving notch; and an inner shaft disposed at least partially within the aperture of the fixed hub, the inner shaft having an upper surface with a recess configured to receive the insertion end of the key, and an outer surface having a projection extending therefrom, and a fixed base configured to couple to a portion of a vehicle, the fixed base defining an inner cavity configured to at least partially receive the inner shaft, wherein the cable link includes a notch configured to receive the projection of the inner shaft, whereby rotation of the key imparts rotation to the inner shaft, which then imparts rotation to the cable link.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As briefly mentioned above, the present application is directed to a three position push/pull actuator system driven by an external key to thereby manually engage or disengage the transmission park pawl without the driver having to leave the vehicle. In one example, a rotary actuator assembly is located below a vehicle cup holder in the floor console. The cup holder liner is removed along with an access cover in the cup holder substrate, thereby exposing the rotary actuator assembly for insertion of the key. The driver can rotate the key to drive a cable to engage or disengage the park pawl without the driver having to leave the seated position or remove his/her foot from the brake. Accordingly, the system enables manual movement of the vehicle transmission from a park position to an out-of-park (neutral) position. Moreover, the system includes features to prevent removal of the key from the actuator assembly unless the transmission is in the park position and the rotary actuator assembly is in an inactive position to thereby prevent interference with normal electronic shifting.

Figure 1:
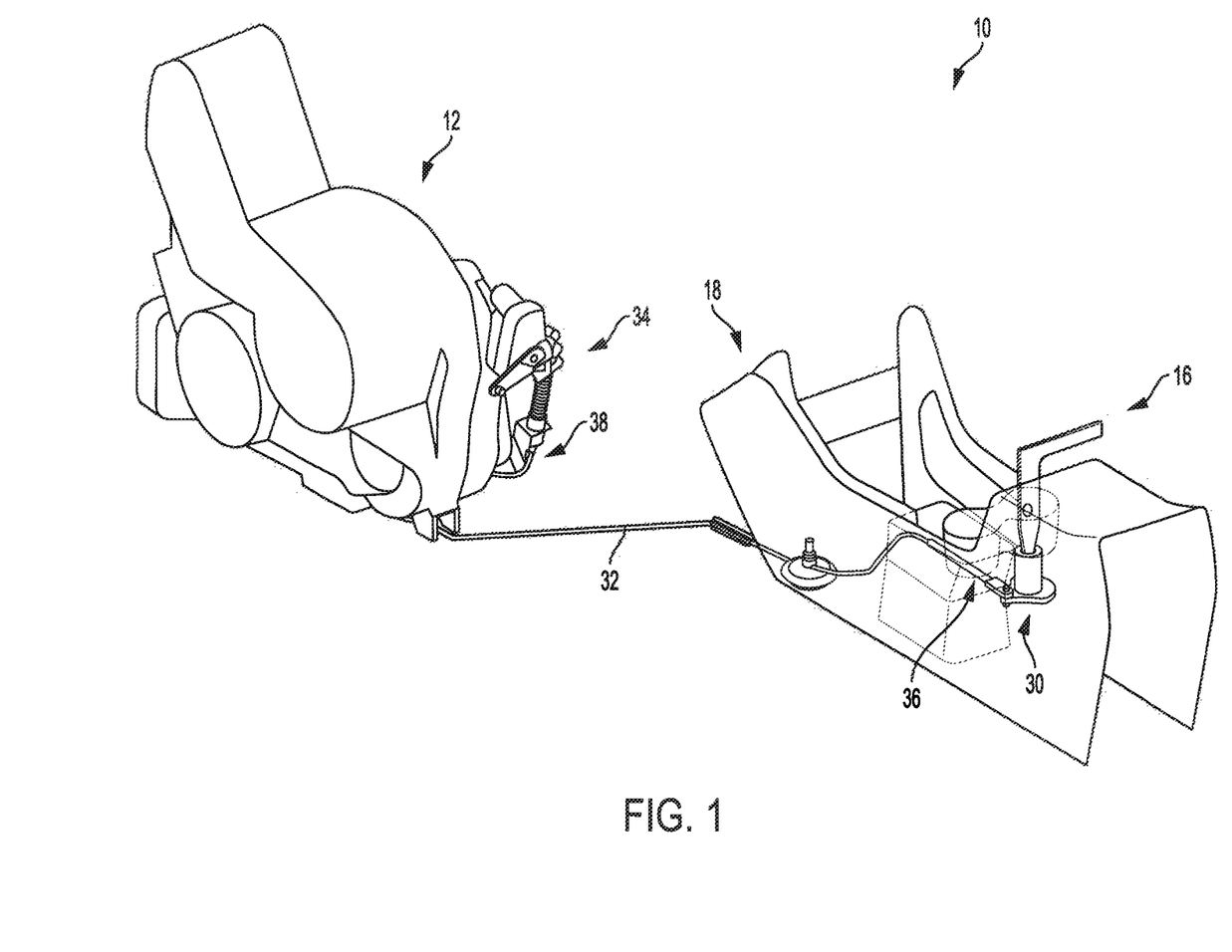
FIG. 1 is perspective view of an example transmission, floor console, and manual park release system in accordance with the principles of the present disclosure.

With initial reference to FIG. 1, an example vehicle transmission system for a vehicle engine is illustrated and generally identified at reference numeral 10. The transmission system 10 generally includes a transmission 12, a shifter 14 (FIG. 2), and a manual park release system 16.

In the example embodiment, transmission 12 is an electronically variable transmission. However, it will be appreciated that transmission 12 is not limited to an electronically variable transmission. Transmission 12 is linked to an engine (not shown) and/or an onboard battery system (not shown) through one or more output shafts (not shown). Rotational output from the engine or battery system is received by transmission 12 through a torque converter assembly (not shown). The torque converter assembly then transfers the rotational output through a gear set (not shown) to a transmission output (not shown), and then on to a drivetrain of the motor vehicle.

In the example embodiment, shifter 14 is an electronic shifter mounted to a floor console 18 of the vehicle. Typical transmission gears to be selected are park (P), reverse (R), neutral (N), and drive (D). However, electronic shifter 14 does not include a mechanical cable or link to the transmission 12. Instead the electronic shifter 14 is in signal communication with the transmission 12 for shifting gears thereof. Thus, the transmission system 10 requires the ability to mechanically shift the transmission 12 into and out of park in situations such as where the electronical shiftable transmission malfunctions, the vehicle experiences a complete loss of power, emergencies (accidents/towing), the electronic shifter 14 is inoperable, during service, or other situations. Accordingly, in the example implementation, manual park release system 16 is utilized to manually shift transmission 12 into and out of park.

Figure 2:
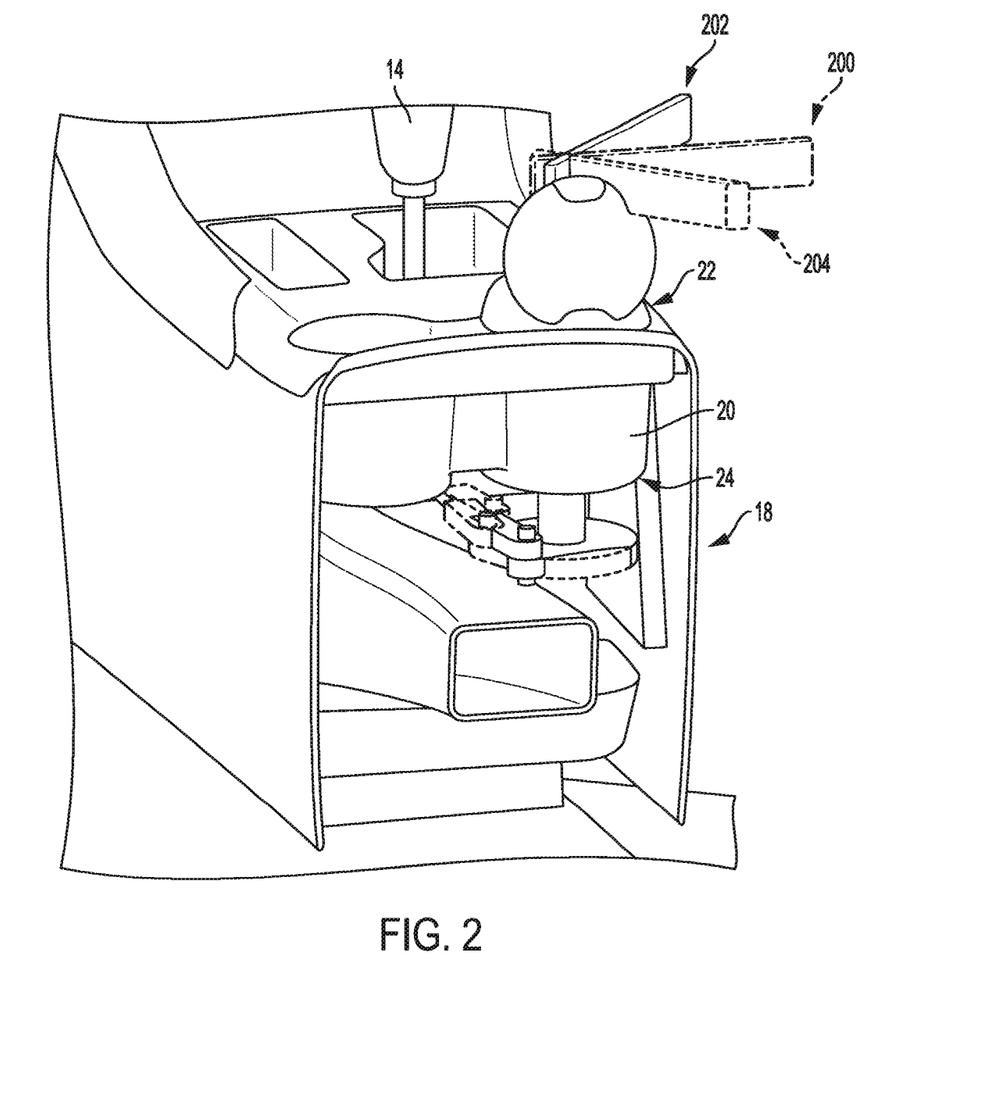
FIG. 2 is a sectional view of the floor console illustrating the manual park release system in three different positions, in accordance with the principles of the present disclosure.

With reference to FIG. 2, manual park release system 16 is implemented into the floor console 18 of the vehicle. The floor console 18 includes a cup holder 20 having an open upper end 22 and a closed bottom end 24. In one example, in order to utilize the manual park release system 16, a cup holder liner (not shown) is removed from the cup holder 20, thereby exposing a port of the manual park release system 16. The port is configured to receive a key to enable operation of the manual park release system 16, as described herein in more detail.

With continued reference to FIG. 1, the manual park release system 16 generally includes a rotary actuator assembly 30, a manual park release cable 32, and a park release linkage assembly 34. Rotary actuator assembly 30 is disposed in the floor console 18 and is coupled to one end 36 of the manual park release cable 32. The opposite end 38 of the manual park release cable 32 is coupled to park release linkage assembly 34, which is in turn operably coupled to the transmission 12. Actuation of the rotary actuator assembly 30 pushes or pulls the manual park release cable 32, which rotates park release linkage assembly 34 to drive the transmission 12 into and out of park.

Figure 3:
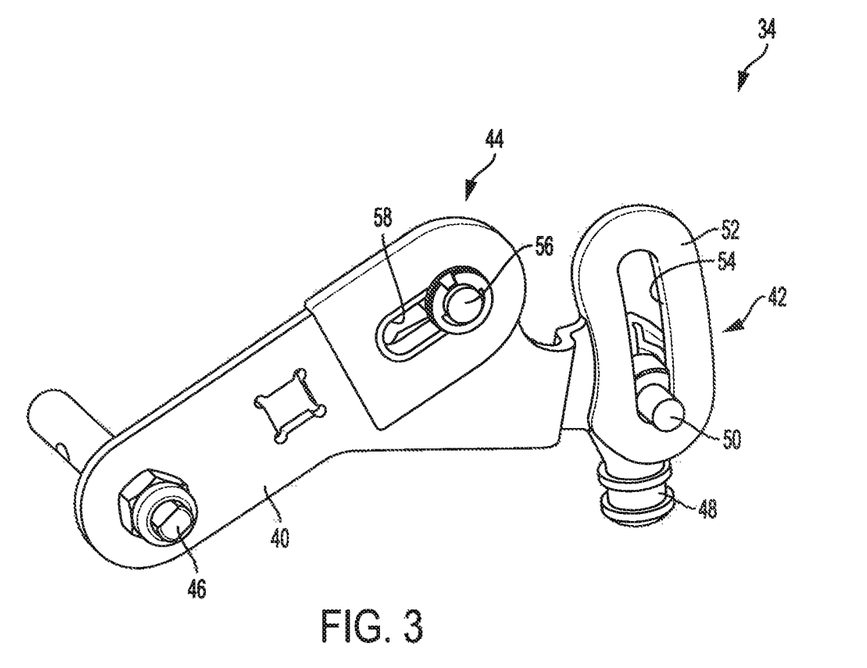
FIG. 3 is a perspective view of one example park pawl linkage assembly that may be used with the manual park release system shown in FIG. 1, in accordance with the principles of the present disclosure.

In one embodiment shown in FIG. 3, park release linkage assembly 34 generally includes a lever 40, a cable link member 42, a power actuator link member 44, and a transmission detent pivot pin 46. The cable link member 42 includes an attachment portion 48 configured to couple to the opposite end of the manual park release cable 32, and a pin 50 configured to slide along a track member 52. Pushing/puling of cable 32 causes pin 50 to slide along a track 54 to thereby rotate lever 40 and thus detent pivot pin 46. Rotation of detent pivot pin 46 causes transmission 12 to shift into and out of park.

The power actuator link member 44 includes a slide 56 configured to couple to a park detent actuator (not shown) that is utilized when the vehicle is operating normally and manual park release system 16 is not required. The slide 56 is configured to slide along a track 58. Energizing the park detent actuator causes the slide 56 to slide along track 58 to thereby rotate lever 40 and thus detent pivot pin 46. As noted above, rotation of detent pivot pin 46 causes transmission 12 to shift into and out of park. However, it will be appreciated that park release linkage assembly 34 can have various other configurations that enable assembly 34 to function as described herein.

Figure 4:
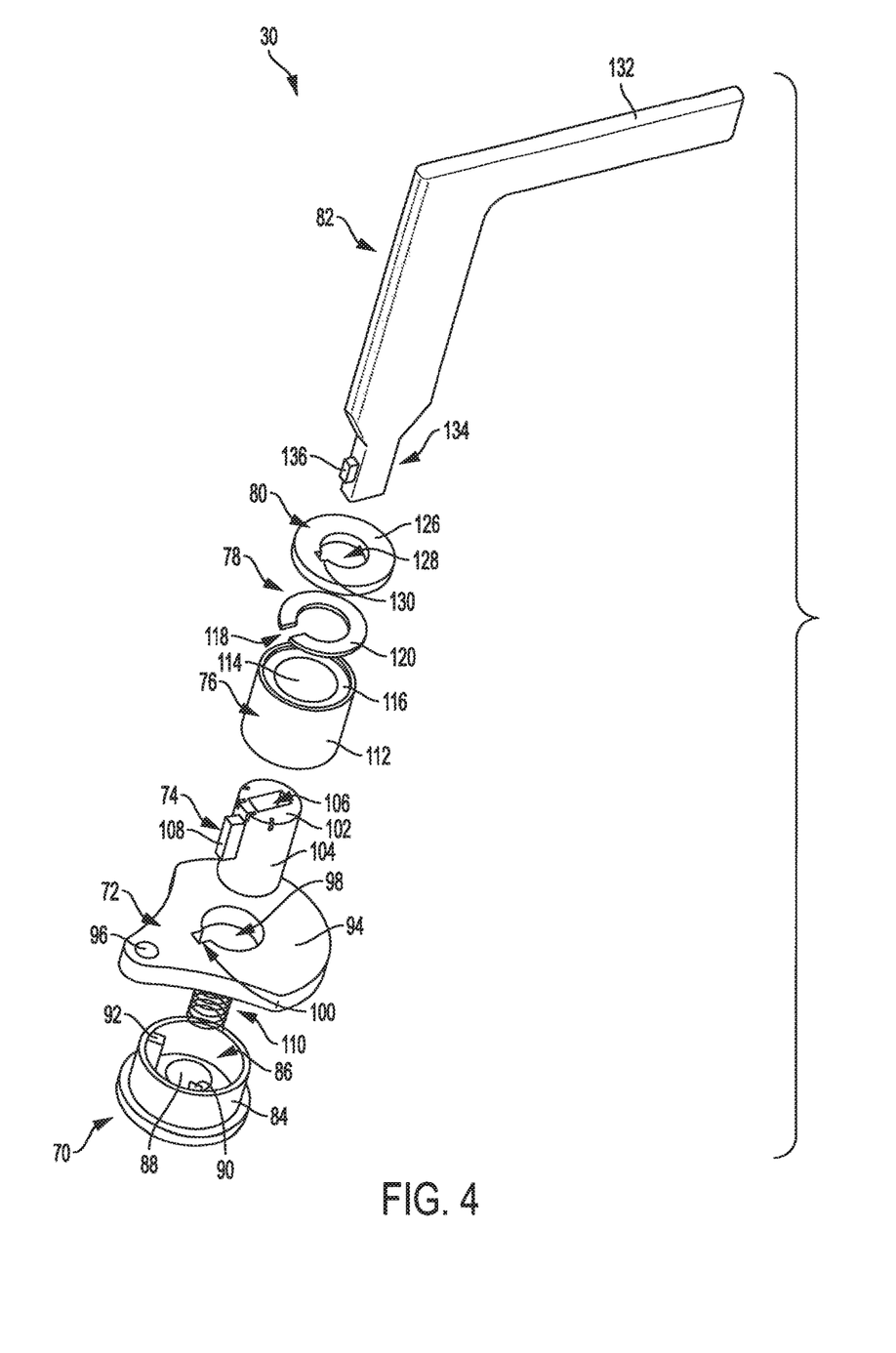
FIG. 4 is a perspective view of an example portion of the manual park release system before assembly, in accordance with the principles of the present disclosure.

With additional reference to FIGS. 4-6, the rotary actuator assembly 30 will be described in more detail. As shown in FIG. 4, rotary actuator assembly 30 generally includes a fixed base 70, a cable link 72, an inner shaft 74, a fixed hub 76, an inner locking ring 78, and outer ring 80, and a key 82.

In the example embodiment, fixed base 70 is generally tubular and defines an annular wall 84, an inner cavity 86, a vertical stop 88, a first rotational stop 90, and a second rotational stop 92. Fixed base 70 is coupled or secured to a portion of the vehicle such as the floor console 18 beneath the cup holder 20.

Cable link 72 is configured to be disposed against fixed base 70 and generally includes a body 94 defining a first aperture 96 and a second aperture 98. First aperture 96 is configured to receive a portion of the one end of manual park release cable 32 for coupling thereto, for example, as illustrated in FIG. 5. Second aperture 98 includes a notch 100 to receive inner shaft 74.

In the illustrated example, inner shaft 74 is cylindrical or generally cylindrical and includes an upper surface 102 and an outer surface 104. Upper surface 102 includes a recess 106 formed therein configured to receive key 82, and outer surface 104 includes a projection 108 extending outwardly therefrom. Cable link aperture 98 is configured to receive inner shaft 74 such that projection 108 is received within notch 100 of cable link 72. In this way, rotation of inner shaft 74 causes rotation of cable link 72. A biasing member 110 (e.g., a spring) is disposed between fixed base vertical stop 88 and inner shaft 74, and is configured bias inner shaft 74 in an upward direction to a position, for example, as shown in FIG. 4.

In the example embodiment, fixed hub 76 is tubular and generally includes an annular wall 112 defining an aperture 114 to receive inner shaft 74. Annular wall 112 includes an upper end defining a ledge or seat 116 configured to receive inner locking ring 78 such that inner locking ring 78 sits flush within annular wall 112. In one example, fixed hub 76 includes three keyways (not shown) within aperture 114 that orient key 82 therein in three different positions, as described herein. When biasing member 110 biases inner shaft 74 upward (as shown in FIG. 6A), key 82 is disposed in one of the three keyways, which prevents rotation of key 82. When key 82 is pushed downward to overcome the bias of member 110, inner shaft 74 is disengaged from fixed hub 76 and key 82 can subsequently be rotated. When key 82 is then released, biasing member 110 biases inner shaft 74 upward into fixed hub 76 where it is reengaged, and key 82 is moved into one of the three keyways, again preventing rotation of key 82 until it is depressed again.

Figure 7A:
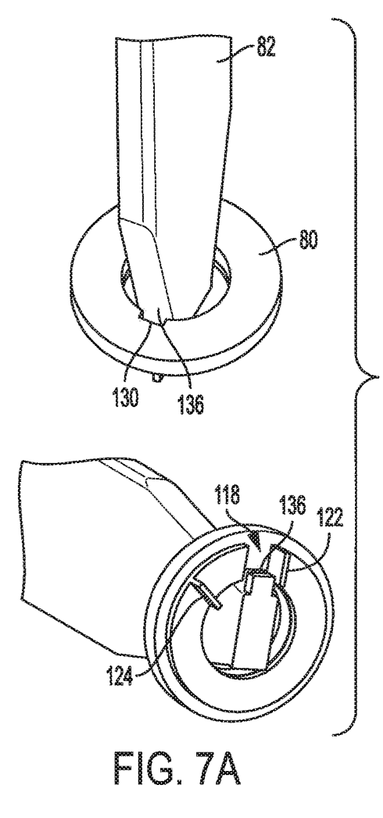
FIG. 7A is a top and bottom perspective view of a portion of the manual park release system shown in FIG. 4 in a first orientation during operation, in accordance with the principles of the present disclosure.

In the illustrated example, inner locking ring 78 is annular or generally annular and includes notch or gap 118 that enables a portion of key 82 to pass therethrough. As shown in FIG. 7A, a bottom surface 120 of the inner locking ring 78 includes a first stop projection 122 and a second stop projection 124 configured to be selectively engaged by key 82, as described herein in more detail.

In the example embodiment, outer ring 80 is coupled to fixed hub 76 such that both are prevented from rotational movement. Outer ring 80 generally includes an annular body 126 defining a receiving aperture 128 having a receiving notch 130. The receiving notch 130 is configured to allow key 82 to pass through aperture 128 in only a single orientation to assure the rotary actuator assembly 30 is in an inactive position before removal of key 82, as described herein in more detail.

In the example embodiment, key 82 generally includes a handle 132 and an insertion end 134 having a keyed projection 136. Key 82 is configured to be inserted into rotary actuator assembly 30 into an inactive first position 200, shown in FIG. 5. Rotating the key 82 counterclockwise (as shown in FIG. 5) to an out-of-park second position 202 is configured to pull cable 32, which rotates detent pivot pin 46 and shifts the transmission 12 out of park (into neutral). In this orientation, keyed projection 136 does not align with the receiving notch 130 of fixed outer ring 80, and key 82 cannot be removed from rotary actuator assembly 30 in this position. Rotating the key 82 clockwise (as shown in FIG. 5) to an in-park third position 204 is configured to push cable 32, which rotates detent pivot pin 46 in the opposite direction and shifts transmission 12 into park.

Figure 5:
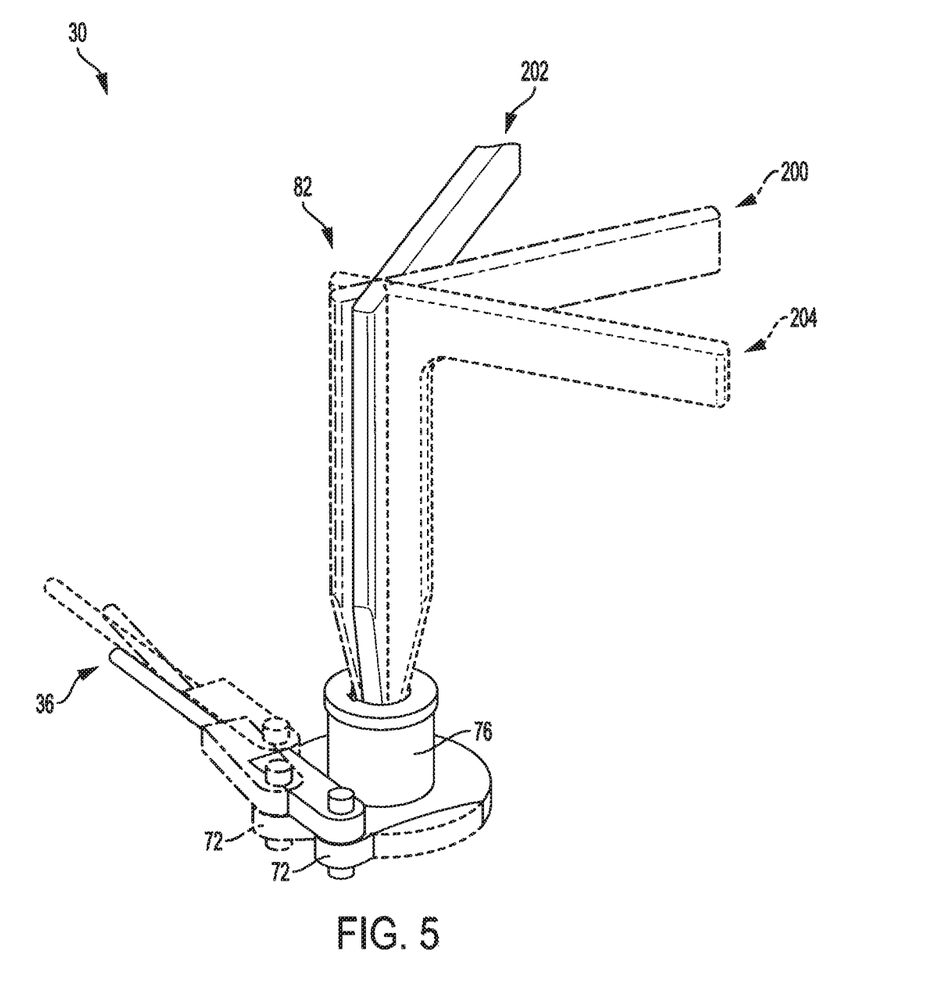
FIG. 5 is a perspective view of the manual park release system shown in FIG. 2, in accordance with the principles of the present disclosure.
Figure 6A:
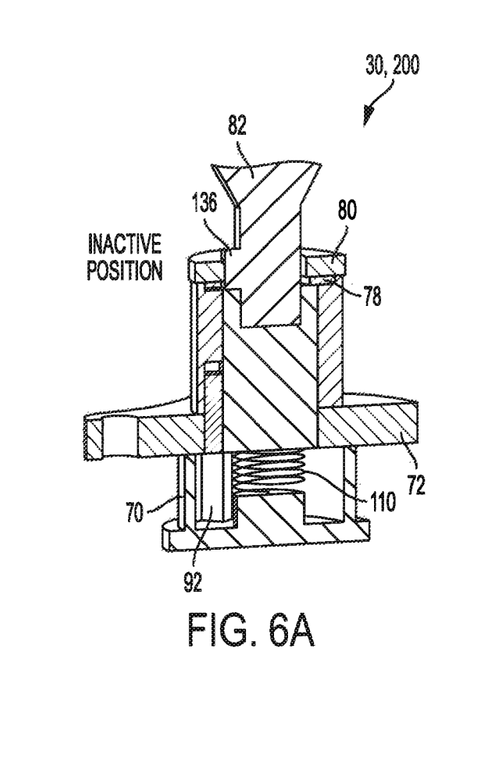
FIG. 6A is a cross-sectional view of a portion of the manual park release system in a first position, in accordance with the principles of the present disclosure.
Figure 6B:
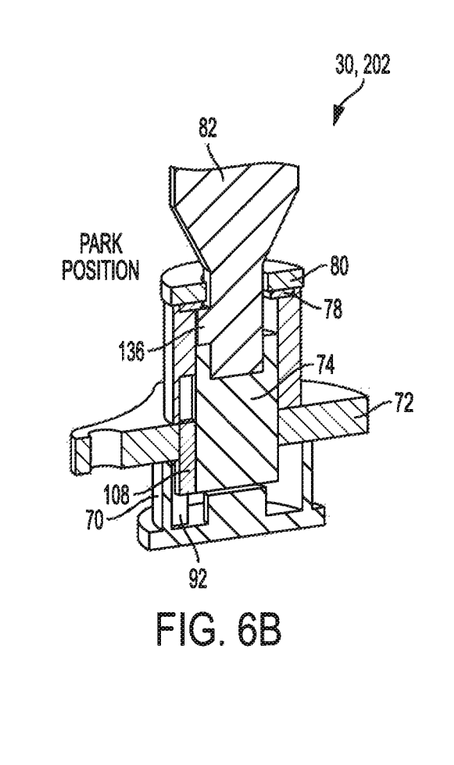
FIG. 6B is a cross-sectional view of the portion of the manual park release system shown in FIG. 6A in a second position, in accordance with the principles of the present disclosure.
Figure 6C:
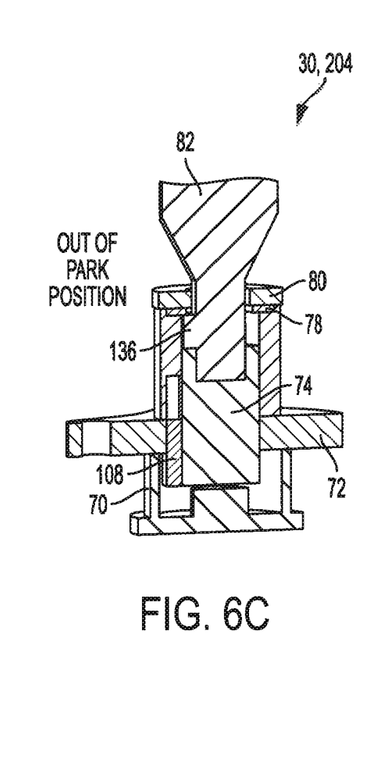
FIG. 6C is a cross-sectional view of the portion of the manual park release system shown in FIG. 6A in a third position, in accordance with the principles of the present disclosure.

With further reference to FIGS. 5-7, an example operation of the manual park release system 16 will be described. In order to utilize the manual park release system 16, for example when the vehicle batteries have no charge, a vehicle occupant must first expose or gain access to the rotary actuator assembly 30. This may be done, for example, by removing a cup holder liner within a cup holder 20. Once exposed, outer ring 80 is visible to the occupant, and the key 82 can be inserted through fixed outer ring 80 by aligning keyed projection 136 with receiving notch 130.

In this inactive position 200 (FIG. 5, 6A, 7A), key insertion end 134 is inserted into the recess 106 of inner shaft 74. The operator then pushes key 82 downward to overcome biasing member 110 and release inner shaft 74 from the fixed hub 76. In this position, key 82 is moved out of one of the three keyways in fixed hub aperture 114. Accordingly, subsequent rotation of key 82 will also rotate inner shaft 74, which is keyed to the cable link via projection 108 and notch 100, thereby imparting the rotation of inner shaft 74 to cable link 72.

Figure 7B:
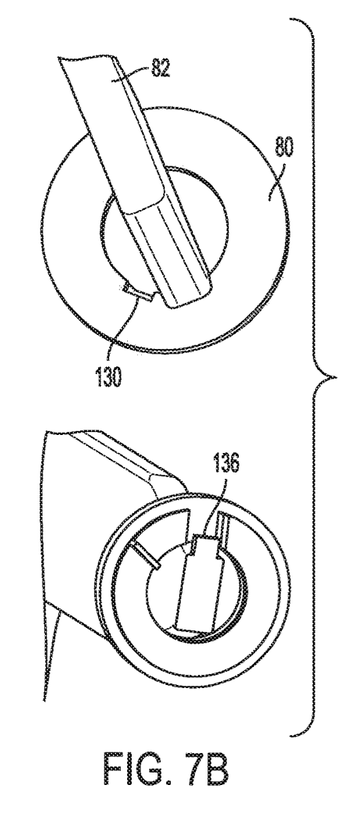
FIG. 7B is a top and bottom perspective view of the portion of the manual park release system shown in FIG. 7A in a second orientation during operation, in accordance with the principles of the present disclosure.
Figure 7C:
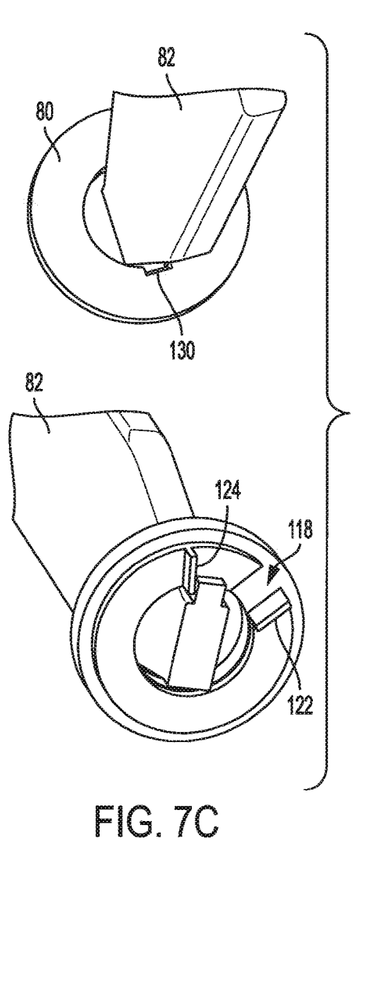
FIG. 7C is a top and bottom perspective view of the portion of the manual park release system shown in FIG. 7A in a third orientation during operation, in accordance with the principles of the present disclosure.

Key 82 can then be rotated until inner shaft projection 108 contacts the first rotational stop 90 of fixed base 70, thereby moving key 82 and rotary actuator assembly 30 to the out-of-park (neutral) position 202 (FIGS. 6B and 7B). Such movement rotates cable link 72 such that cable 32 is pulled, thereby causing rotation of lever 40, which rotates detent pivot pin 46 and moves transmission 12 out of the park gear. The vehicle can then be towed or serviced. Moreover, during this movement to the second position 202, key 82 engages the first stop projection 102 of inner locking ring 78, causing the inner locking ring 78 to rotate and block notch 130 of the outer ring 80. This prevents removal of key 82 while the transmission 12 is in the out-of-park position 202. Further, releasing key 82 enables biasing member 110 to force inner shaft 74 upward to reengage fixed hub 74 and move key 82 into one of the three keyways (not shown), thereby preventing rotation of key 82.

Figure 7D:
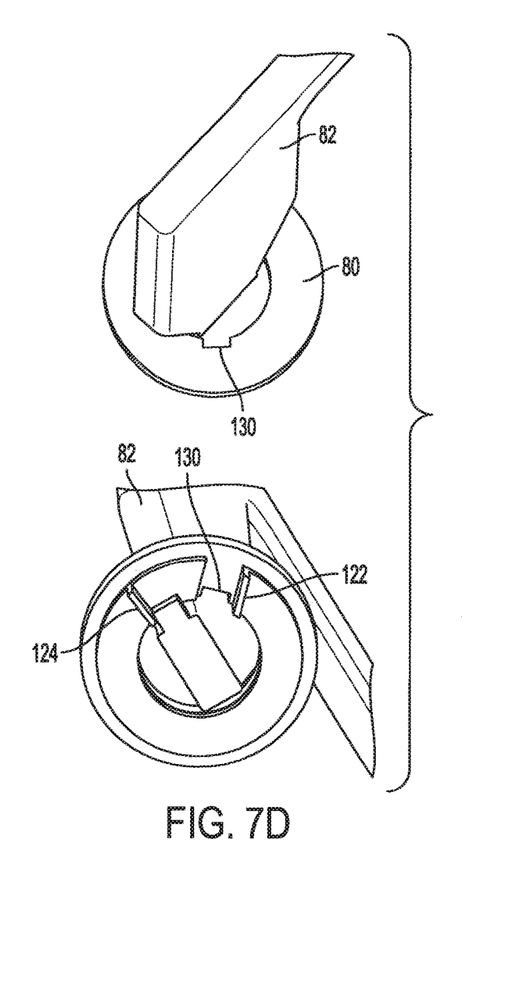
FIG. 7D is a top and bottom perspective view of the portion of the manual park release system shown in FIG. 7A in a fourth orientation during operation, in accordance with the principles of the present disclosure.

Once the vehicle is towed or serviced, the vehicle is returned to the park gear in order to remove key 82 from rotary actuator assembly 30. As such, key 82 is rotated in the opposite direction beyond the inactive position 200 to the park position 204 (FIG. 5). If the key 82 is stopped prematurely at the inactive position, the key 82 still cannot be removed from fixed outer ring 80 due to inner locking ring 78 still blocking notch 130 (see FIG. 7C). Thus, key 82 must be rotated further until inner shaft projection 108 contacts the second rotational stop 92 of fixed base 70, thereby moving key 82 and rotary actuator assembly 30 into the park position 204 (FIGS. 6C and 7D). Such movement rotates cable link 72 such that cable 32 is pushed, thereby causing rotation of lever 40, which rotates detent pivot pin 46 and moves transmission 12 into the park gear. Further, releasing key 82 enables biasing member 110 to force inner shaft 74 upward to reengage fixed hub 74 and move key 82 into one of the three keyways (not shown), thereby preventing rotation of key 82.

During this movement to the third position 204, key 82 engages the second stop projection 124 of inner locking ring 78, causing the inner locking ring 78 to rotate until the gap 118 of inner locking ring 78 aligns with receiving notch 130 of the fixed outer ring 80 (see FIG. 7D). The key 82 is then rotated back to the inactive first position 200 such that keyed projection 136 is aligned with both gap 118 and receiving notch 130. The vehicle transmission 12 is now in park and the rotary actuator assembly is in an inactive position so as to not interfere with the normal operation of transmission 12. The key 82 may then be removed from the rotary actuator assembly 30.

Described herein are systems and methods for manually engaging and disengaging a park pawl of an electronically shiftable transmission without the driver having to leave a seated position in the vehicle. A rotary actuator assembly is coupled to the park pawl linkage via a push/pull cable system. The rotary actuator assembly can be selectively moved between an inactive position, an out-of-park position, and a park position. The rotary actuator includes keyed features that enable shifting of the transmission to the neutral gear (out-of-park position), but prevent removal of a key from the rotary actuator until the transmission has been returned to the park gear (park position) and the rotary actuator assembly is in the inactive position.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A rotary actuator assembly for a manual park release system of a vehicle having a transmission, the assembly comprising:
   a cable link configured to couple to a manual park release cable, the manual park release cable configured to couple to the transmission to selectively move the transmission between a park gear and an out-of-park gear; and
   a key configured to be inserted into, engage and rotate the cable link;
   wherein the key rotates the cable link between distinct first, second, and third positions;
   wherein in the first position the cable link is in an inactive position;
   wherein moving the cable link to the second position moves the manual park release cable to shift the transmission to the out-of-park gear;
   wherein moving the cable link to the third position moves the manual park release cable to shift the transmission to the park gear; and
   wherein the cable link prevents removal of the key from the cable link in the second and third positions.

2. The assembly of claim 1, further comprising an outer ring having a receiving aperture that includes a receiving notch extending radially outward therefrom, the key having an insertion end having a keyed projection extending therefrom, wherein the insertion end can only be inserted into the receiving aperture when the keyed projection is aligned with the receiving notch.

3. The assembly of claim 2, wherein in the first position the key can be inserted into and removed from the outer ring, and wherein in the second and third positions the key cannot be removed from the outer ring.

4. The assembly of claim 2, further comprising:
   a fixed hub fixed from rotation, the fixed hub having an aperture to receive at least a portion of the key; and
   an inner locking ring disposed between the fixed hub and the outer ring.

5. The assembly of claim 4, wherein the inner locking ring includes a radial gap configured to selectively align with the receiving notch, wherein when the gap is aligned with the receiving notch to receive the keyed projection the key can be inserted into and removed from the fixed hub.

6. The assembly of claim 5, wherein the gap is disposed between a first stop projection and a second stop projection each extending outwardly from the inner locking ring, the first and second stop projections configured to be selectively engaged by the keyed projection to rotate the inner locking ring within the fixed hub to selectively block the receiving notch.

7. The assembly of claim 4, further comprising an inner shaft disposed at least partially within the aperture of the fixed hub, the inner shaft having an upper surface and an outer surface, the upper surface having a recess configured to receive the insertion end of the key, and the outer surface having a projection extending therefrom.

8. The assembly of claim 7, wherein the cable link includes a notch configured to receive the projection of the inner shaft, whereby rotation of the key imparts rotation to the inner shaft, which then imparts rotation to the cable link.

9. The assembly of claim 7, further comprising a fixed base configured to couple to a portion of a vehicle, the fixed base defining an inner cavity configured to at least partially receive the inner shaft.

10. The assembly of claim 9, wherein the fixed base comprises:
 a vertical stop configured to facilitate preventing vertical movement of the inner shaft;
 a first rotational stop configured to selectively engage the projection of the inner shaft when the cable link is in the second position; and
 a second rotational stop configured to selectively engage the projection of the inner shaft when the cable link is in the third position.

11. A manual park release system for an electronically shifted transmission, the system comprising:
 a park release linkage assembly configured to couple to the electronically shifted transmission and shift the electronically shifted transmission between a park gear and an out-of-park gear;
 a manual park release cable having a first end and a second end, the first end coupled to the park release linkage assembly; and
 a rotary actuator assembly comprising:
  a cable link coupled to the second end of the manual park release cable;
  a key configured to be inserted into, engage and rotate the cable link;
  wherein the key rotates the cable link between distinct first, second, and third positions;
  wherein in the first position the cable link is in an inactive position;
  wherein in moving to the second position the cable link moves the manual park release cable to shift the transmission to the out-of-park gear;
  wherein in moving to the third position the cable link moves the manual park release cable to shift the transmission to the park gear; and
  wherein the cable link prevents removal of the key from the cable link in the second and third positions.

12. The system of claim 11, wherein the park release linkage assembly comprises:
 a lever;
 a cable link member coupled between the lever and the first end of the manual park release cable;
 a power actuator link member; and
 a detent pivot pin coupled to the lever and operably coupled to the electronically shifted transmission, wherein pushing or pulling of the manual park release cable causes the lever to rotate, and rotation of the lever causes the detent pivot pin to rotate, wherein rotation of the detent pivot pin shifts the electronically shifted transmission between the park gear and the out-of-park gear.

13. The assembly of claim 11, further comprising an outer ring having a receiving aperture that includes a receiving notch extending radially outward therefrom, the key having an insertion end having a keyed projection extending therefrom, wherein the insertion end can only be inserted into the receiving aperture when the keyed projection is aligned with the receiving notch.

14. The assembly of claim 13, wherein in the first position the key can be inserted into and removed from the outer ring, and wherein in the second and third positions the key cannot be removed from the outer ring.

15. The assembly of claim 13, further comprising:
 a fixed hub fixed from rotation, the fixed hub having an aperture to receive at least a portion of the key; and
 an inner locking ring disposed between and concentrically with the fixed hub and the outer ring.

16. The assembly of claim 15, wherein the inner locking ring includes an outer circumferential surface, a bottom surface, and a radial gap configured to selectively align with the receiving notch, wherein when the radial gap is aligned with the receiving notch to receive the keyed projection the key can be inserted into and removed from the fixed hub.

17. The assembly of claim 16, wherein the gap is disposed between a first stop projection and a second stop projection each extending outwardly from the inner locking ring bottom surface, the first and second stop projections configured to be selectively engaged by the keyed projection to rotate the inner locking ring within the fixed hub to selectively block the receiving notch.

18. The assembly of claim 15, further comprising:
 an inner shaft disposed at least partially within the aperture of the fixed hub, the inner shaft having an upper surface and an outer surface, the upper surface having a recess configured to receive the insertion end of the key, and the outer surface having a projection extending therefrom; and
 a fixed base configured to couple to a portion of a vehicle, the fixed base defining an inner cavity configured to at least partially receive the inner shaft;
 wherein the cable link includes a notch configured to receive the projection of the inner shaft, whereby rotation of the key imparts rotation to the inner shaft, which then imparts rotation to the cable link.

* * * * *